(12) United States Patent
Cagle

(10) Patent No.: US 9,034,059 B2
(45) Date of Patent: May 19, 2015

(54) WAX COMPOSITIONS INCLUDING A SLIP AGENT

(75) Inventor: John E. Cagle, Greenfield, MA (US)

(73) Assignee: The Yankee Candle Company, Inc., S. Deerfield, MA (US)

(*) Notice: Subject to any disclaimer, the term of this patent is extended or adjusted under 35 U.S.C. 154(b) by 246 days.

(21) Appl. No.: 13/444,239

(22) Filed: Apr. 11, 2012

(65) Prior Publication Data

US 2013/0270474 A1    Oct. 17, 2013

(51) Int. Cl.
*C11C 5/00*    (2006.01)
*C08L 91/06*    (2006.01)

(52) U.S. Cl.
CPC *C11C 5/002* (2013.01); *C08L 91/06* (2013.01)

(58) Field of Classification Search
CPC ......... C08L 91/06; C08L 91/08; C08L 83/04; C11C 5/002
USPC .......................................................... 44/275
See application file for complete search history.

(56) References Cited

U.S. PATENT DOCUMENTS

| 4,118,203 | A | 10/1978 | Beardmore et al. |
| 4,866,026 | A | 9/1989 | Henzel et al. |
| 5,690,865 | A | 11/1997 | Kindt-Larsen et al. |
| 6,383,502 | B1 | 5/2002 | Dunshee et al. |
| 7,588,607 | B1* | 9/2009 | Cap .................................. 44/275 |
| 7,829,651 | B2 | 11/2010 | Shiobara et al. |
| 2007/0094916 | A1 | 5/2007 | Burkhamer et al. |

OTHER PUBLICATIONS

International Search Report and Written Opinion of the International Searching Authority in corresponding International Application No. PCT/US2013/36188 dated Aug. 13, 2013 (17 pgs.).

* cited by examiner

*Primary Examiner* — Cephia D Toomer
(74) *Attorney, Agent, or Firm* — Wilmer Cutler Pickering Hale and Dorr LLP

(57) ABSTRACT

A wax composition comprising various waxes and an organically modified polysiloxane (OMP). These materials are mixed and melted into a homogenous liquid state creating a molten blend. It is preferred that the slip agent be added to the blend at least 0.25 percent by weight, and more preferably at 0.50 percent by weight. By mixing OMP with known candle and wax potpourri waxes, the wax becomes much easier to remove from the wax container.

5 Claims, 1 Drawing Sheet

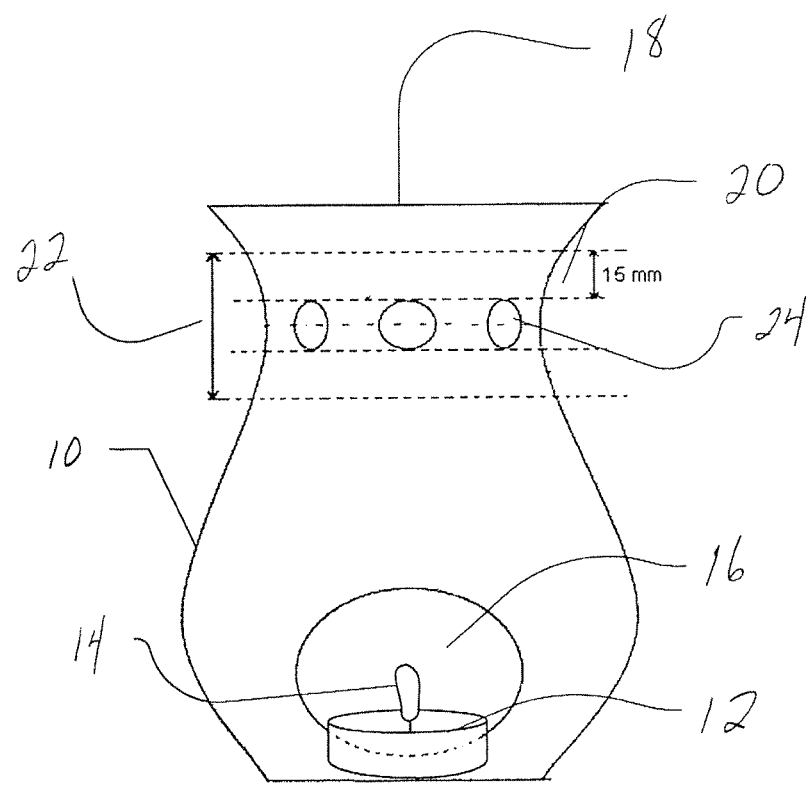

WAX COMPOSITIONS INCLUDING A SLIP AGENT

FIELD OF THE INVENTION

This application relates to non-consumable wax compositions used in a candle or a scented wax product, and more particularly to such a wax composition containing a slip agent.

BACKGROUND OF THE INVENTION

Scented wax, or more particularly, scented wax potpourri, is a popular product used to impart a fragrance into a space such as a room. Unlike a traditional candle, scented wax potpourri has no embedded wick, and the scented wax is not consumed during use. Scented wax potpourri functions by imparting scent while it is in a liquid phase for a period of time caused by use of a burner. During the liquid phase, volatile and semi-volatile fragrance components are released into the air from the melted wax.

An example of a scented wax potpourri is Almond Cookie Tarts® Wax Potpourri with a net weight of 22 grams, sold under item #1163579, by the Yankee Candle Company, 16 Yankee Candle Way, South Deerfield, Mass. 01373.

Scented wax potpourri is used in a device that has the ability to heat the wax potpourri, Such devices may be electrically heated or flame heated by a tealight candle. An example of an electric unit is the Everyday Ceramic Tarts® Wax Potpourri Warmer Item #1228663 sold by the Yankee Candle Company, 16 Yankee Candle Way, South Deerfield, Mass. 01373. An example of a tealight burner is the Amber Mosaic Tarts® Wax Potpourri Warmer Item #1226799 sold by the Yankee Candle Company, 16 Yankee Candle Way, South Deerfield, Mass. 01373.

A typical wax potpourri burner 10 is shown in FIG. 1. The burner 10 includes a tealight 12 which produces heat through a flame 14 which heat passes through tealight opening 16. Heat travels in an upward direction through the burner 10 toward the wax potpourri reservoir 18 where the heat is transferred from the flame to the heat transfer zone 22 to melt the scented wax in wax potpourri melting zone 20. Vent holes 24 are also typically provided.

Wax potpourri burners vary in composition, construction, and size. A typical burner can hold up to 50 g of scented wax potpourri and may be made of glass or ceramic and be constructed in a variety of shapes. Melting of the scented wax potpourri results in active fragrance release for up to 10 hours at which time the fragrance strength weakens. Scented wax potpourri's end of life is determined by the weakening of scent release. The spent scented wax potpourri is left to solidify and subsequently removed from the burner to make room for new scented wax potpourri.

The removal of the spent scented wax potpourri presents challenges to the end user. The solidified scented wax potpourri can adhere to the burner making removal difficult. A popular method of removal entails the placement of the burner in a household freezer. The scented wax potpourri undergoes contraction with a drop in temperature causing the release from the burner. This practice requires extra handling and can be overly cumbersome, especially with electric burners. The electrical cord must either be placed into the freezer with the wax potpourri burner or left to hang outside the freezer. The method also prevents immediate reuse of the burner because it must be chilled to remove the older wax before new wax could be used.

Yet another popular method used to remove the spent scented wax potpourri is to add warm water to the melted scented wax potpourri while in use. The water, being both immiscible and denser than liquefied scented wax potpourri, sinks to the bottom of the wax potpourri burner where it forms a limited barrier between the liquefied scented wax potpourri and burner, preventing to some degree, wax adhesion. This practice is ill advised as it can result in hot spilled wax caused by overfilling the burner. Additionally, adhesion can not be completely eliminated due to the limited coverage the water provides.

Accordingly, it would be advantageous to the end user to be able to easily remove the spent scented wax potpourri at room temperature, thus mitigating the risks associated with the wax removal methods described above. If possible, room temperature removal would be achievable without the use of extraneous tools or devices. Furthermore, such an invention would be transparent to the end-user who would realize the benefit without noticing any change in the wax potpourri.

BRIEF DESCRIPTION OF THE DRAWING

FIG. 1 is a view of a wax potpourri burner.

SUMMARY OF THE INVENTION

The present invention is a scented wax potpourri composition comprising various waxes and a slip agent which in the preferred embodiment is an organically modified polysiloxane (OMP). These materials are mixed and melted into a homogenous liquid state creating a molten blend. It is preferred that the slip agent be added to the blend at least 0.05 percent by weight, and more preferably at 0.50 percent by weight. By mixing OMG with known candle and wax potpourri waxes, the wax becomes much easier to remove from the wax container.

DETAILED DESCRIPTION OF THE INVENTION

The present invention is a wax composition comprising various waxes and an organically modified polysiloxane (OMP). One such OMP is designated EFKA 3299 and is sold by BASF Corporation of 100 Campus Drive, Florham Park, N.J. 07932.

EFKA 3299 is a non-reactive, clear, colorless, and odor-neutral material that is added directly to a scented wax potpourri batch to create a final "blend". The scented wax potpourri is manufactured by mixing together the various materials and waxes. These materials are mixed and melted into a homogenous liquid state creating a molten blend. It is preferred that the EFKA 3299 be added to the blend at least 0.05 percent by weight, and more preferably at 0.50 percent by weight.

It is an important aspect of this invention that the slip agent be compatible with materials and waxes used to make wax composition, be chemically inert, clear, colorless, and odor-neutral. Chemical inertness is required to ensure no reactions between the materials and waxes used in making the final wax composition. Clear, colorless, and odor-neutral attributes are important so as not to affect the final appearance or required fragrance character of a scented wax product respectively.

One embodiment of the present invention is a wax composition for scented wax potpourri which may be formed using existing processes known in the art, such as, liquid pouring and molding, wax bead extruding, or wax bead compression. A preferred embodiment of the present invention uses wax beads compressed by means of a hydraulic press. In this preferred embodiment, the scented wax potpourri is manufactured by mixing together the materials listed below in Table 1. These materials are mixed and melted into a homogenous liquid state creating a molten "blend". A molten blend is then sprayed into the air via nozzles with an orifice of 0.35 mm or 0.4 mm onto a rotating cold drum where small spheres (approximately 0.25 mm-1.25 mm in diameter) are formed. The small spheres are scraped off the cold drum into a vibrating pan and collected at a point of vacuum. The vacuum delivers small spheres into a candle pressing molding machine, such as the machine sold by Kurschner (now Herrhammer), GmbH Model No. 2375 under the name Hydraulic Candle Press. The small spheres are compressed under pressure to form a solid scented wax potpourri.

The scented wax potpourri may be made from a number of combustible materials, such as fully refined paraffin, semi-refined paraffin, beeswax, soy wax, epoxidized soybean oil, tallow, microwax, palm wax, mineral wax, polyethylene wax, normal alpha olefins, poly alpha olefins, or other triacyglycerol-type materials or combustible polymers.

In one embodiment of the invention the following materials within Ranges 1 and 2 are used:

TABLE 1

Scented Wax Potpourri Composition

| Purpose | Material | Product | Vendor | Range 1 | Range 2 |
|---|---|---|---|---|---|
| Fuel | Fully refined paraffin | 1222A | IGI Waxes | 98.95% | 41.25% |
| Hardness and melt point control | Semi-refined Paraffin | 2281A | IGI Waxes | 0.000% | 41.25% |
| Crystalline modifier | Micro-crystalline wax | 5715A | IGI Waxes | 0.000% | 6.00% |
| Crystalline modifier | Poly alpha olefin | Vybar 260 | Baker Petrolite | 0.000% | 2.00% |
| Protectant | UV absorber | Chimassorb 81 | BASF | 0.000% | 0.20% |
| Protectant | UV absorber | Tinuvin 329 | BASF | 0.000% | 0.20% |
| Protectant | Antioxidant | Irganox B225 | BASF | 0.000% | 0.10% |
| Slip Agent | Organically Modified Polysiloxane | EFKA 3299 | BASF | 0.05% | 1.00% |
| Function | Scent | Variable | Variable | 1.000% | 8.00% |
| Colorant | Oil soluble dyes | Variable | Variable | Quantity Sufficient | q.s. |

EXAMPLE

A control test scented wax potpourri batch was created by mixing together and homogenizing the materials in Table 2. Upon complete homogenization the batch was processed in accordance to the method described above.

TABLE 2

Control Test

| Supplier | Material | Product | Weight Percent |
|---|---|---|---|
| IGI Waxes | Fully refined paraffin | 1222A | 91.7% |
| Baker Petrolite | Poly alpha olefin | Vybar 260 | 1.0% |
| BASF | Protectant | Tinuvin 329 | 0.15% |
| BASF | Protectant | Chimassorb 81 | 0.15% |
| Takasago | Scent | Pineapple Cilantro | 7.0% |
| Variable | Oil soluble dyes | Variable | q.s. |

In a separate batch EFKA 3299 test scented wax potpourri wax was created by mixing together and homogenizing the materials in Table 3. Upon complete homogenization the batch was processed in accordance to the method as previously described.

TABLE 3

EFKA 3299 Test

| Supplier | Material | Product | Weight Percent |
|---|---|---|---|
| IGI Waxes | Fully refined paraffin | 1222A | 91.2% |
| Baker Petrolite | Poly alpha olefin | Vybar 260 | 1.0% |
| BASF | Protectant | Tinuvin 329 | 0.15% |
| BASF | Protectant | Chimassorb 81 | 0.15% |
| Takasago | Scent | Pineapple Cilantro | 7.0% |
| BASF | Organically modified polysiloxane | EFKA 3299 | 0.5% |
| Variable | Oil soluble dyes | Variable | Quantity Sufficient |

From each batch, scented wax potpourri was produced in 22 g compressed units. The 22 g units were tested for ease of removal at room temperature by placing both thumbs on and applying pressure to the solid spent scented wax potpourri after six hours of liquification time in both a glazed ceramic Tealight wax potpourri burner and a glass Tealight wax potpourri burner. The force required to remove the spent scented wax potpourri from the wax potpourri burner was gauged on a sliding numeric value from 1="minimum removal force required" to 10="maximum removal force required" As gauged by the tester removing the wax with his/her thumbs while holding the wax potpourri burner.

The test results expressed in Table 4 show that the scented wax potpourri containing the EFKA 3299 organically modified polysiloxane required less removal force compared to the control scented wax potpourri.

TABLE 4

Spent Scented Wax Potpourri Removal Test

| Control Test | Trial A | Trial B | Trial C | EFKA 3299 Test | Trial A | Trial B | Trial C |
|---|---|---|---|---|---|---|---|
| Glazed Ceramic Tealight Tart Burner | | | | | | | |
| Sample 1 | 8 | 10 | 10 | Sample 1 | 1 | 1 | 1 |
| Sample 2 | 6 | 10 | 10 | Sample 2 | 1 | 1 | 1 |
| Sample 3 | 2 | 10 | 8 | Sample 3 | 1 | 1 | 1 |
| Sample 4 | 3 | 10 | 10 | Sample 4 | 1 | 1 | 1 |
| Trial Average | 4.75 | 10 | 9.5 | Trial Average | 1 | 1 | 1 |
| Test Average | | 8.08 | | Test Average | | 1 | |
| Glass Tealight Tart Burner | | | | | | | |
| Sample 1 | 10 | 10 | 10 | Sample 1 | 1 | 1 | 1 |
| Sample 2 | 10 | 10 | 10 | Sample 2 | 1 | 1 | 1 |
| Sample 3 | 10 | 10 | 10 | Sample 3 | 1 | 1 | 1 |
| Trial Average | 10 | 10 | 10 | Trial Average | 1 | 1 | 1 |
| Test Average | | 10 | | Test Average | | 1 | |

Key:
1 = Minimum removal force required
10 = Maximum removal force required

While the foregoing invention has been described with reference to its preferred embodiments, various alterations and modifications will occur to those skilled in the art. All such alterations and modifications are intended to fall within the scope of the appended claims.

What is claimed:

1. A wax potpourri composition comprising:
   one or more wax materials;
   polysiloxane mixed with said wax materials to facilitate removal of said wax material from a container when said wax material is in a solid state, said polysiloxane comprising at least 0.25% by weight of the composition,
   wherein said wax materials and polysiloxane are compressed to form a wax potpourri.

2. The wax potpourri composition of claim 1 wherein said polysiloxane comprises between 0.25% and 1.00% by weight of the composition.

3. The wax potpourri composition of claim 1 wherein said polysiloxane comprises at least 0.50% by weight of the composition.

4. The wax potpourri composition of claim 1 wherein said one or more wax materials comprise between 41.25% to 98.95% by weight of fully refined paraffin.

5. The wax potpourri composition of claim 1 wherein said one or more wax materials comprise not more than 41.25% of semi-refined paraffin.

* * * * *